No. 730,458. PATENTED JUNE 9, 1903.
H. W. HOWE.
CAMERA SUPPORT.
APPLICATION FILED JUNE 28, 1902.
NO MODEL.
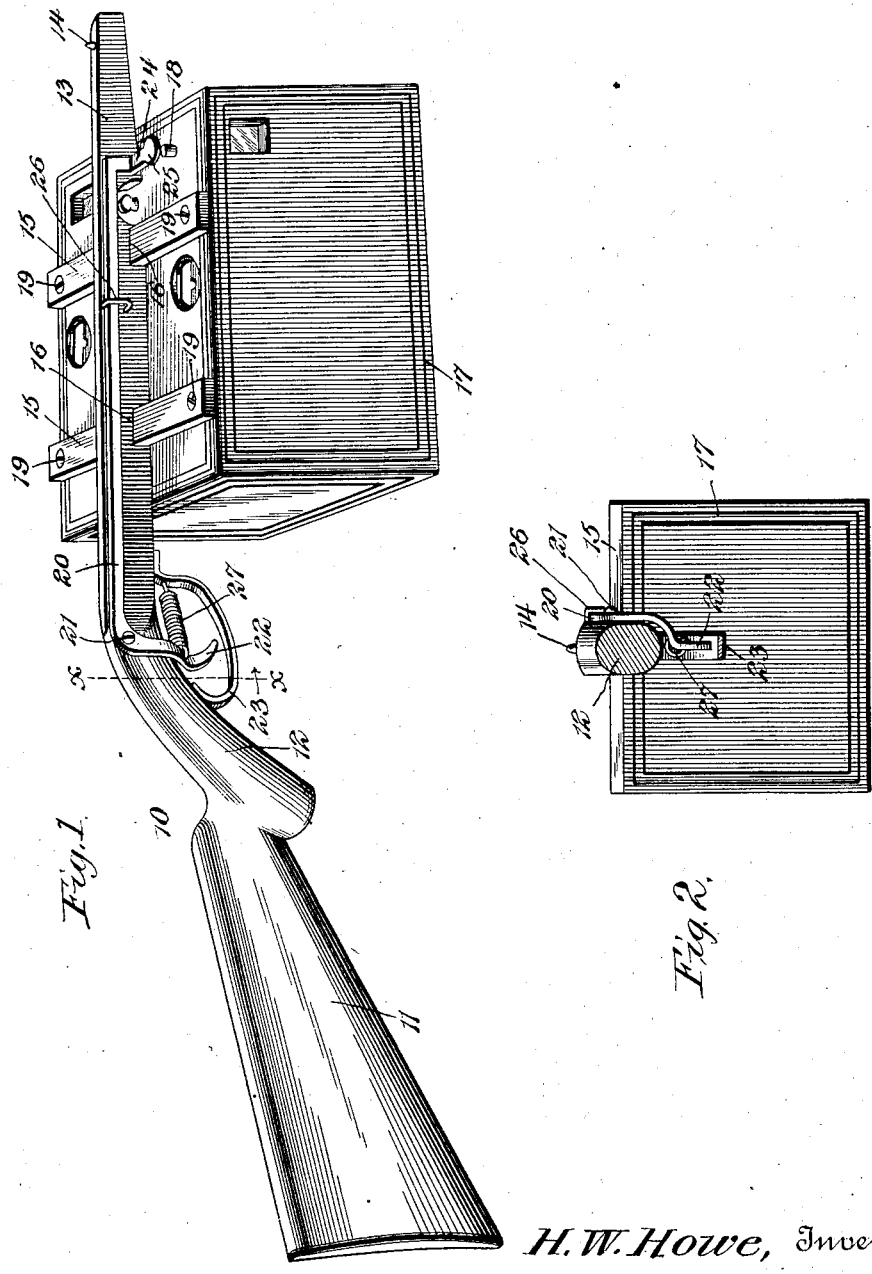
H. W. Howe, Inventor,
Witnesses No. 730,458.

Patented June 9, 1903.

UNITED STATES PATENT OFFICE.

HENRY W. HOWE, OF MEXICO, MEXICO.

CAMERA-SUPPORT.

SPECIFICATION forming part of Letters Patent No. 730,458, dated June 9, 1903.

Application filed June 28, 1902. Serial No. 113,647. (No model.)

*To all whom it may concern:*

Be it known that I, HENRY W. HOWE, a citizen of the United States, residing in the city of Mexico, Mexico, have invented a new and useful Camera-Support, of which the following is a specification.

This invention relates to improvements in camera-supports; and the object thereof is to provide a simple device designed to be used in connection with any well-known form of hand-camera for expeditiously making instantaneous exposures of moving objects, so that the images of said objects will be properly centered upon the plates or films.

As is well known by those skilled in the art of photography, in making such exposures, even with a camera having a universal focus, considerable preparation is necesary not only in arranging the plate or film and setting the shutter, but in properly positioning the camera with respect to the object to be taken, this being ordinarily accomplished by sighting said object through the finder of the camera. This method is very uncertain, and it often occurs that the image is thrown on the plate or sensitized film at an angle or the object is not properly centered thereon, and it often happens that the object has passed out of range before the camera can be properly adjusted. By means of this invention all the objections noted above can be readily overcome.

The preferred form of construction is illustrated in the accompanying drawings, wherein—

Figure 1 is a perspective view of the support, showing a well-known form of hand-camera attached thereto. Fig. 2 is a vertical sectional view taken on the line X X of Fig. 1.

Similar numerals of reference designate corresponding parts in both figures of the drawings.

In this embodiment of the invention, as shown, a substantially gun-shaped support is employed, comprising a stock 10, consisting of the usual cheek-piece 11 and a grip 12, the barrel portion of the support being shown at 13 and being provided at its front end with a sight 14. Secured to this barrel portion is a pair of spaced cross-arms 15, preferably fitted in transverse seats 16, formed in the lower face of said barrel portion, and to these cross-arms is secured the camera 17. This camera may be of any well-known construction having an "instantaneous" shutter released by a pin, as 18, projecting through the top of the camera. The camera is suspended beneath the barrel portion, being secured to the arms preferably by screws, as 19.

The means for actuating the shutter-releasing pin 18 is in the form of a lever 20, preferably arranged upon one side of the barrel portion and being pivoted, as shown at 21, contiguous to the connection of said barrel portion with the grip-stock. This pivoted end is provided with a downturned terminal portion constituting a trigger 22, which is bent inwardly, so as to be directly below the grip 12. A guard-plate 23, secured to the under side of the support, surrounds the trigger and protects the same against being accidentally struck. The other end of the lever 20 is provided with an offstanding finger 24, having a terminal head 25, that is located over the releasing-pin 18. A guide-loop 26, secured to the side of the barrel portion, embraces the lever to prevent the lateral displacemement of the same, and a coiled spring 27 is connected at one end to the trigger and at the other end to the guard to normally hold the offset finger 24 raised and away from the release-pin 18.

In using the device the film is first properly positioned and the shutter set. Then when the object comes into range the operator aims the device exactly the same as in shooting with a gun. When the object is properly sighted, it is only necessary to pull the trigger, whereupon the other end of the lever and the finger carried thereby will be depressed, thus being brought into engagement with the pin 18 and releasing the shutter. It will be evident that with this arrangement the camera may be properly positioned much quicker than in the ordinary manner, where it is necessary to sight the object through the finder, and experience has proven that the image of the object will be properly centered upon the sensitized film or plate. A further advantage to be noted in connection with this construction is the suspension of the camera beneath the barrel portion. This not only gives a clear sight along the upper face of said barrel portion, but the camera will naturally hang in a level position, and the operator does not have to exert any unnecessary strain in holding the support against twisting on its longitudinal axis.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In supporting means for an ordinary hand-camera having a shutter and actuating mechanism therefor, said mechanism including an exposed finger-pin, the combination with a gun-shaped support comprising a stock and barrel portion, of a shutter-operating device secured to the support, and means for fastening the camera to the support with the shutter-operating device in coacting relation with the finger-pin of the shutter-actuating means.

2. In supporting means for an ordinary hand-camera having a shutter and actuating mechanism therefor, said means including an exposed depressible finger-pin, the combination with a gun-shaped support comprising a stock and barrel portion, of a shutter-releasing lever pivoted intermediate its ends upon the support, said lever having a trigger at one end and a finger at the other, and means for detachably securing the camera to the barrel portion of the support with the pin of said camera beneath the finger of the lever.

In testimony that I claim the foregoing as my own I have hereto affixed my signature in the presence of two witnesses.

HENRY W. HOWE.

Witnesses:
FENTON R. MCCREERY,
E. FUENTEVILT, Jr.